March 31, 1959     A. L. SHELTON     2,880,033
RUMBLE SEAT CONSTRUCTION
Filed June 21, 1957
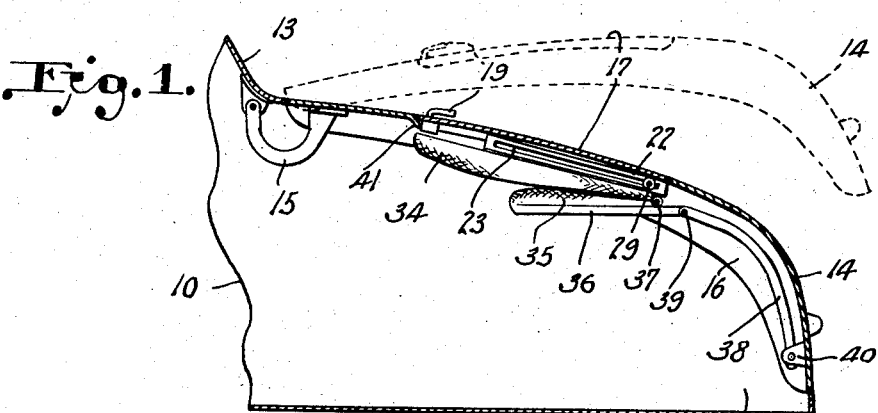
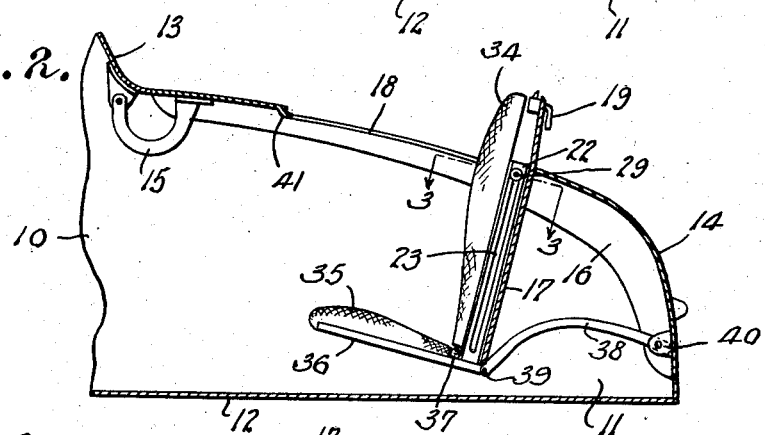
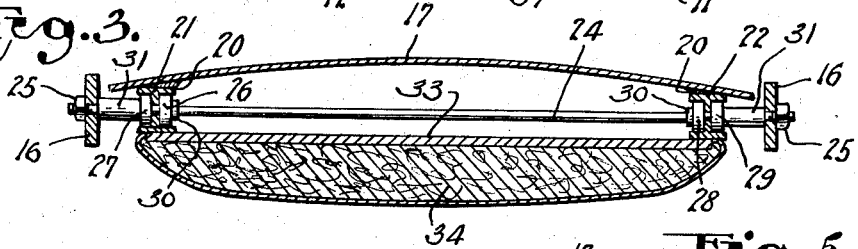
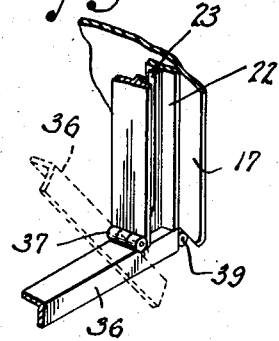
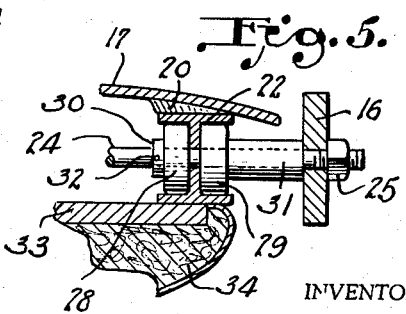
INVENTOR.
ALVIN L. SHELTON
BY
*Patrick D. Beavers*
ATTORNEY.

United States Patent Office 2,880,033
Patented Mar. 31, 1959

2,880,033

RUMBLE SEAT CONSTRUCTION

Alvin Lanier Shelton, Lynchburg, Va.

Application June 21, 1957, Serial No. 667,095

1 Claim. (Cl. 296—66)

This invention relates to improvements in rumble seats for automobiles and more particularly to a rumble seat that utilizes the trunk lid to form a part of the seat.

An object of this invention is to provide more seating capacity for sport type automobiles that conventionally carry only two people.

Another object of this invention is to utilize the trunk lid of an automobile as a part of the seat and as a support for the seat assembly.

During inclement weather a folding canvas top may be used in conjunction with the rumble seat to protect the occupants thereof from the natural elements.

When the seat is not in use, it can be closed or folded and the trunk can be used in the conventional manner.

The spare tire that is conventionally carried in the trunk can be moved so that three people may occupy the seat at the same time.

With the above and other objects and advantages in view, the invention consists of the novel details of construction, arrangement and combination of parts more fully hereinafter described, claimed and illustrated in the accompanying drawing, in which:

Fig. 1 is a longitudinal sectional view of a rumble seat embodying the invention with the trunk lid shown in closed and partially open positions;

Fig. 2 is a longitudinal sectional view showing the rumble seat in extended position;

Fig. 3 is a longitudinal sectional view on the line 3—3 of Fig. 2;

Fig. 4 is a fragmentary detailed perspective view of the hinge arrangement of the rumble seat; and Fig. 5 is a detailed fragmentary sectional view of roller guide and roller arrangement for the rumble seat.

Referring more in detail to the drawing, wherein like parts are designated by like reference numerals, the reference numeral 10 is used to designate a portion of an automobile that is of the type known as a coupe or sport coupe or convertible.

The automobile 10 has a trunk compartment 11 that is provided with a floor 12 and a rear deck or top portion 13 that is shaped or curved to conform to the body style of the automobile.

Access is gained to the trunk compartment 11 by means of a trunk lid 14 which is hinged as at 15 to the rear deck 13. Depending flanges 16 are usually provided along the longitudinal edges of the trunk lid 14 to reinforce the trunk lid 14.

The elements previously described are of conventional design and applicant's invention consists in providing a rumble seat construction that is associated with and utilizes in its structure the trunk lid 14.

To provide the rumble seat, a portion 17 is cut from the trunk lid 14 to provide the back rest of the rumble seat. When the portion 17 is cut from the trunk lid 14, an opening 18 is provided through which passengers will gain access to the rumble seat. A latch 19 is provided on the portion 17 to retain the portion in closed position when the rumble seat is not occupied. The contour of the portion 17 is not changed in any respect so that when the portion 17 is closed, as in Fig. 1, it will blend into the contour of the trunk lid 14 from which it has been cut. Secured to the portion 17 along the side edges thereof as by welding 20, are a pair of eye-shaped roller guides 21 and 22, respectively. An elongated slot 23 is provided in each roller guide longitudinally thereof to receive a shaft 94 that is journalled in the flanges 16 of the trunk lid 14 and a nut 25 is threaded on each end of the shaft 24 to retain it in fixed relation to the flanges 16.

An inner roller 26 and an outer roller 27 are mounted in the roller guide 21 in rolling engagement therewith. An inner roller 28 and an outer roller 29 are mounted in the roller guide 22 in rolling engagement therewith. A stop collar 30 is mounted on the shaft 24 in engagement with each of the inner rollers 26 and 28 and a spacer sleeve 31 is mounted on the shaft 24 in engagement with the outer rollers 27 and 29 and the flanges 16. Each of the stop collars 30 are provided with a set screw 32 so that the collars 30 can be retained in fixed relation to the shaft 24 or to permit the assembly to be removed if desired. The collars 30 and sleeves 31 prevent lateral movement of the portion 17 on the shaft 24.

A rigid back rest 33 is rigidly secured to the roller guides 21 and 22 and an upholstered back rest 34 is secured to the back rest 33. An upholstered seat bottom 35 is mounted on a pair of angle iron seat supports 36 which are hinged at 37 to the lower ends of the roller guides 21 and 22, respectively. The seat supports 36 extend beyond the roller guides 21 and 22 to terminate at a point contiguous with the lower edge of the portion 17.

An arcuate shaped swing brace 38 is hingedly connected as at 39 to the end of each of the supports 36 and the braces 38 are contoured to conform to the shape of the trunk lid 14.

The opposite ends of the braces 38 are pivotally connected to apertured ears 40 that are welded to the interior of the trunk lid 14.

In operation, the latch 19 is opened and the portion 17 may be raised by pulling on the latch 19. The back seat assembly by reason of the shaft 24 sliding in the slots 23 will assume the position shown in Fig. 2. The rollers 26, 27, 28 and 29 permit easy movement of the back seat assembly in relation to the roller guides 21 and 22. The seat bottom assembly will move into the position shown in Fig. 2 by reason of the hinges 37 and the swing brace 38 will retain the rumble seat assembly in the proper position.

When desired, the portion 17 may be moved into closed position and the trunk compartment 11 may be used in the conventional manner by raising the trunk lid 14. A keeper 41 is provided in the trunk lid 14 to engage the latch 19 to retain the portion 17 in closed position. A gasket may outline the edges of the trunk lid forming the opening 18 to prevent water from entering the trunk compartment 11 when the portion 17 is in closed position.

It is believed that from the foregoing description the operation and construction of the invention will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

For use with an automobile having a trunk lid provided with an opening therein, a rumble seat assembly comprising a back rest, a pair of slotted roller guides each affixed adjacent an opposite side of said back rest, a shaft extending horizontally adjacent the rear of said opening and affixed at its ends to said lid, said shaft extending through the slots of said guides, rollers mounted on said shaft and engaging with said guides, a seat bottom, a pair of seat supports affixed to said seat bottom and hinged to the lower end of said back rest, and an arcuately shaped link interconnecting each of said seat supports and the rear portion of said lid.

References Cited in the file of this patent

UNITED STATES PATENTS

| | | |
|---|---|---|
| 1,156,408 | Kiehler | Oct. 12, 1915 |
| 1,591,153 | Bourgon | July 6, 1926 |
| 1,806,692 | Lemon | May 26, 1931 |
| 2,043,804 | Montgomery | June 9, 1936 |
| 2,046,175 | Lim | June 30, 1936 |
| 2,678,681 | Haltenberger | May 18, 1954 |